United States Patent
Spertus (10) Patent No.: US 9,934,541 B1
(45) Date of Patent: Apr. 3, 2018

(54) METHOD AND APPARATUS FOR INFERRING REALWORLD IDENTITIES

(71) Applicant: Symantec Corporation, Mountain View, CA (US)

(72) Inventor: Michael Spertus, Mountain View, CA (US)

(73) Assignee: SYMANTEC CORPORATION, Mountain View, CA (US)

(*) Notice: Subject to any disclaimer, the term of this patent is extended or adjusted under 35 U.S.C. 154(b) by 852 days.

(21) Appl. No.: 14/042,353

(22) Filed: Sep. 30, 2013

(51) Int. Cl.
- *G06F 7/04* (2006.01)
- *G06F 15/16* (2006.01)
- *G06F 17/30* (2006.01)
- *H04L 29/06* (2006.01)
- *G06Q 50/26* (2012.01)
- *G06Q 10/02* (2012.01)

(52) U.S. Cl.
CPC ............ *G06Q 50/265* (2013.01); *G06Q 10/02* (2013.01)

(58) Field of Classification Search
CPC ....................................... G06Q 10/02
USPC ............................................. 726/4
See application file for complete search history.

(56) References Cited

U.S. PATENT DOCUMENTS

| | | | | |
|---|---|---|---|---|
| 2005/0146417 A1* | 7/2005 | Sweatte | ............ | G07C 9/00087 340/5.2 |
| 2010/0190510 A1* | 7/2010 | Maranhas | ............ | G06Q 10/02 455/456.1 |
| 2013/0262333 A1* | 10/2013 | Wicker | ............ | G06Q 10/00 705/325 |
| 2014/0006070 A1* | 1/2014 | Stamler | ............ | G06Q 10/02 705/5 |
| 2014/0270400 A1* | 9/2014 | Natale | ............ | G06Q 10/02 382/115 |
| 2015/0012305 A1* | 1/2015 | Truskovsky | ............ | G06Q 10/02 705/5 |

* cited by examiner

*Primary Examiner* — Morshed Mehedi
*Assistant Examiner* — Khalil Naghdali
(74) *Attorney, Agent, or Firm* — Maschoff Brennan (57) ABSTRACT

A method for inferring real world identities is provided. The method includes receiving an authenticated copy of a document, the document having identification information and the document subject to a security check. The method includes providing evidence that an owner of the authenticated copy of the document passed the security check validating the identification information contained in the document. The method includes asserting that a device is associated with a real-world identity corresponding to the identification information listed in the authenticated copy of the document, in response to a determination that the owner of the authenticated document entered the secured area. At least one method operation is executed through a processor.

18 Claims, 4 Drawing Sheets

METHOD AND APPARATUS FOR INFERRING REALWORLD IDENTITIES

BACKGROUND

Creating online identities is relatively easy. Verifying an association between an online identity and a real-world identity is not so straightforward. For example, creating an online identity typically may require a user to prove association with a particular email account. Yet, email accounts can be created readily and are not necessarily directly associated with a real-world identity. Particularly, email accounts can be piggybacked off of other email accounts, so that any tie to a real-world identity is kept hidden. One standard for a real-world identity check is to verify a government-issued ID (e.g., an identification card such as a driver's license or a passport) with an in-person appearance of an individual. In-person ID checks are time-consuming, and add expense. In-person ID checks do not readily translate to verification of an online identity. Electronically sending a scanned copy of a government-issued ID bypasses copy-protection technologies built into these IDs, and fails to distinguish between a borrowed or stolen ID and a legitimate ID which matches the real-world identity of the person.

SUMMARY

In some embodiments, a method for inferring real world identities is provided. The method includes receiving an authenticated copy of a document, the document having identification information and the document subject to a security check. The method includes providing evidence that an owner of the authenticated copy of the document passed the security check validating the identification information contained in the document. The method includes asserting that a device is associated with a real-world identity corresponding to the identification information listed in the authenticated copy of the document, in response to a determination that the owner of the authenticated document entered the secured area. At least one method operation is executed through a processor.

In some embodiments, a tangible, non-transient, computer-readable media having instructions thereupon which, when executed by a processor, cause the processor to perform a method is provided. The method includes acquiring, from a mobile communication device, an electronic copy of a mobile boarding pass, the mobile boarding pass for a passenger on an airline flight from a first airport to a second airport. The method includes acquiring, from the mobile communication device, global positioning system (GPS) coordinates and determining whether the GPS coordinates correspond to one from a group consisting of: the first airport, the second airport, and a stopover airport of the airline flight. The method includes indicating that the mobile communication device is associated with a valid inferred real-world identity corresponding to an identity of the passenger indicated by the electronic copy of the mobile boarding pass, responsive to determining that the GPS coordinates correspond to one of the group.

In some embodiments, an identity inferring system is provided. The system includes a memory and a processor, coupled to the memory. The processor and the memory are operable to communicate with a mobile communication device and load an electronic copy of a mobile boarding pass from the mobile communication device to the memory. The information obtainable from the electronic copy of the mobile boarding pass includes an identity and at least one from a group consisting of: a first airport, a second airport, and a stopover airport. The processor and the memory are operable to load global positioning system (GPS) coordinates from the mobile communication device to the memory and evaluate whether the GPS coordinates correspond to a member of the group. The processor and the memory are operable to associate the mobile communication device with the identity as a valid inferred real-world identity, responsive to a positive result of such evaluating and to provide authentication that the mobile communication device is associated with the valid inferred real-world identity, in response to a request regarding the mobile communication device.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
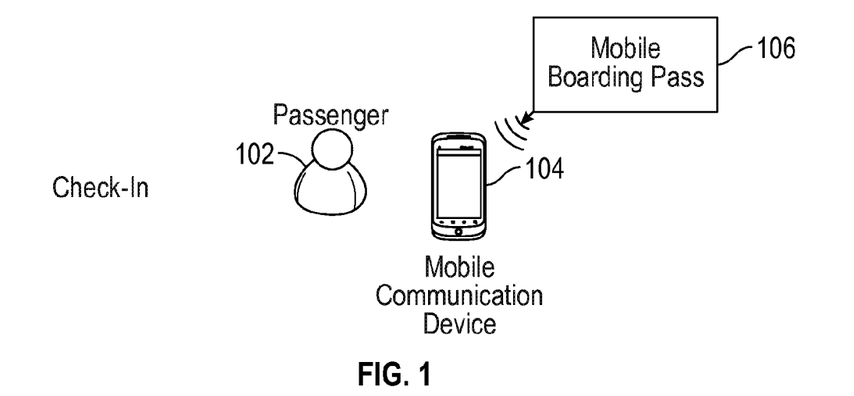
FIG. 1 is an activity diagram showing a passenger checking in for an airline flight, and receiving a mobile boarding pass onto a mobile communication device in accordance with some embodiments.
Figure 2:
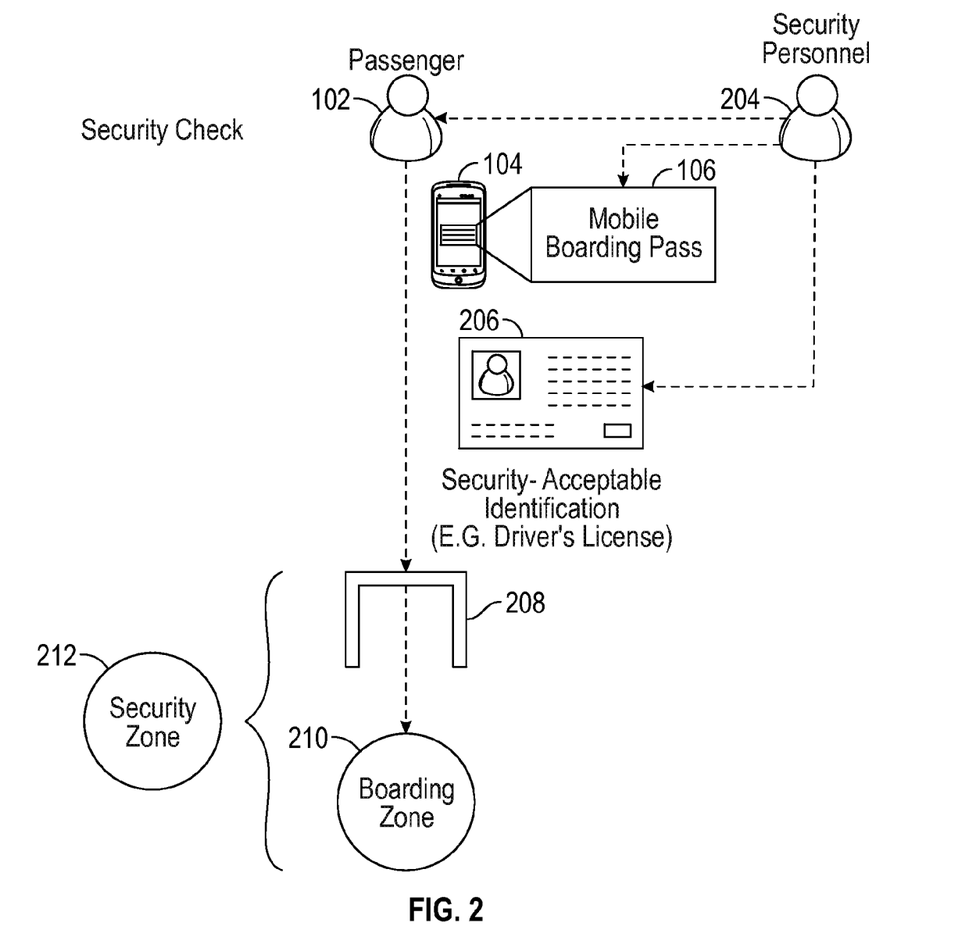
FIG. 2 is an activity diagram showing the passenger of FIG. 1 undergoing a security check, in which the mobile boarding pass and an identification of the passenger are verified against the in-person appearance of the passenger, by security personnel in accordance with some embodiments.
Figure 3:
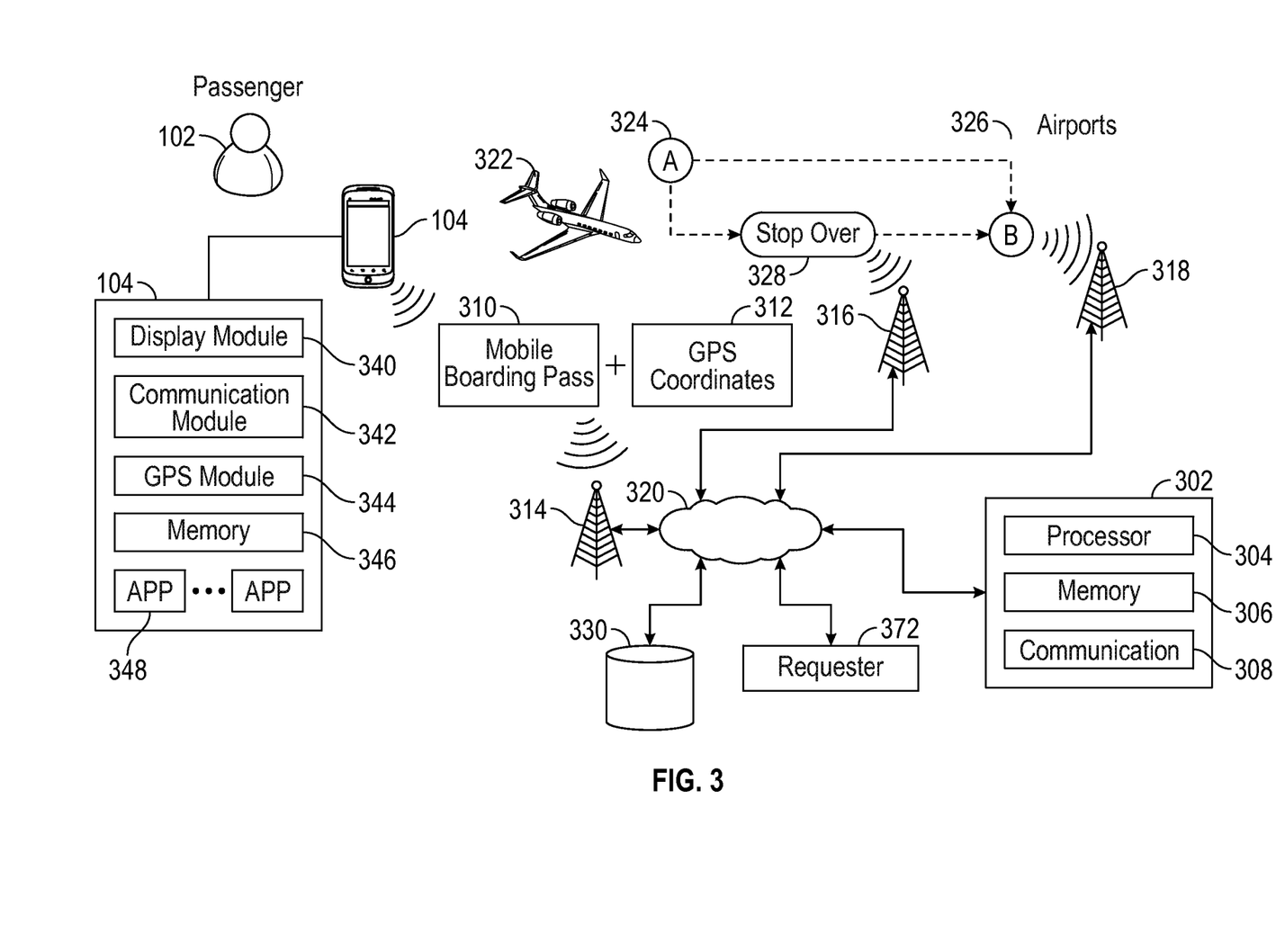
FIG. 3 is a system diagram of an identity inferring system, which associates the mobile communication device of the passenger with a valid inferred real-world identity in accordance with some embodiments.
Figure 4:
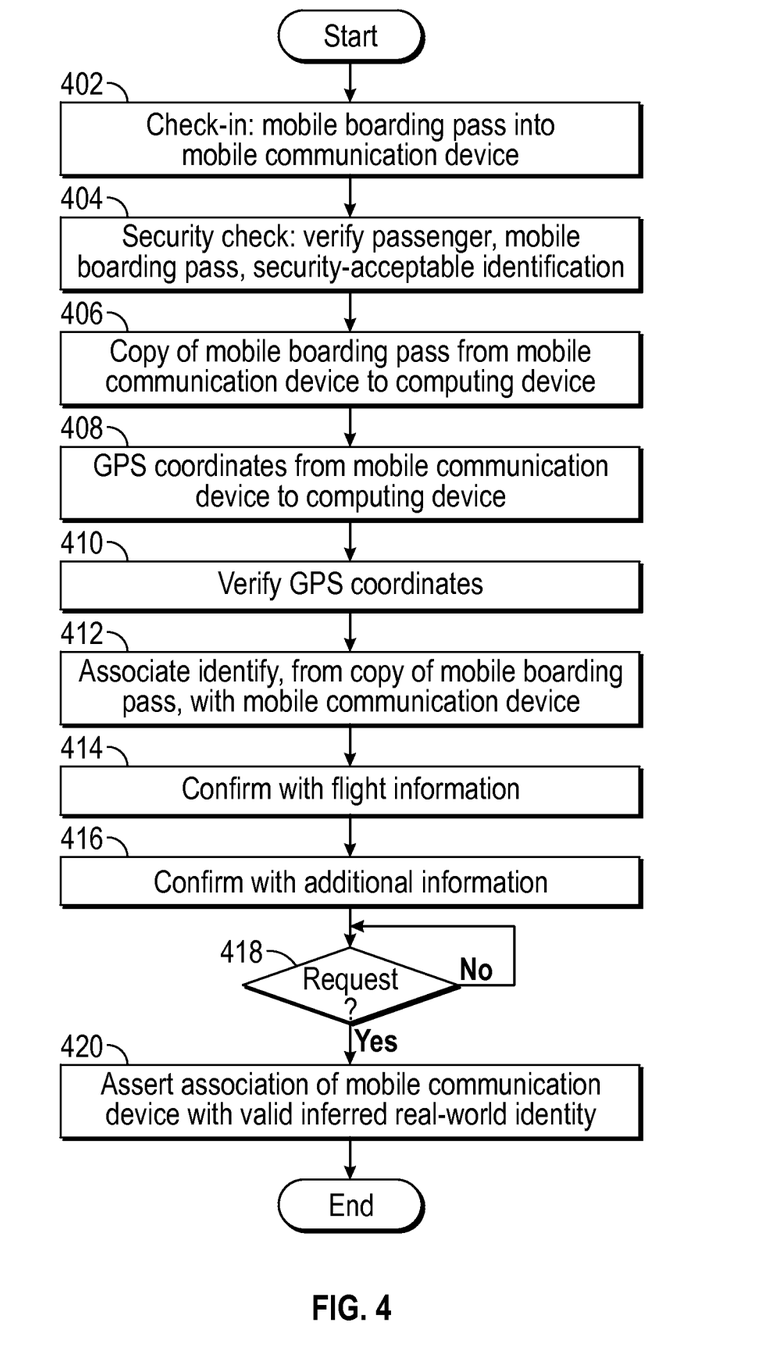
FIG. 4 is a flow diagram of a method for inferring real-world identities, which can be practiced using activities as shown in FIGS. 1, 2 and 3, and/or the identity inferring system of FIG. 3 in accordance with some embodiments.
Figure 5:
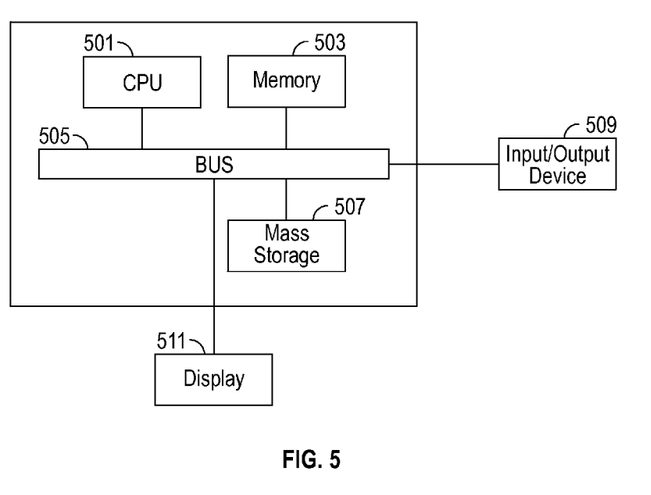
FIG. 5 is an illustration showing an exemplary computing device which may implement the embodiments described herein.

A method for inferring real-world identities, and a related identity inferring system, offer solutions to the above-discussed problems. Embodiments of the method and the system associate a mobile communication device with a valid inferred real-world identity. By leveraging a security check, for example the TSA (Transportation Security administration) check at an airport in some embodiments, the method and system can infer that an online user's claimed online ID (identification) corresponds to the user's government-issued ID or other security-acceptable ID. A user, who is a passenger on an airline flight, checks in at the airport and receives a mobile boarding pass onto a mobile communication device, such as a cellular phone. The user proceeds through a security check (e.g., the TSA check) at the airport, in which the mobile boarding pass and a security-acceptable ID (e.g., a driver's license or a passport) are verified with the in-person appearance of the user, by security personnel. The user then sends an electronic copy of the mobile boarding pass, plus GPS (global positioning system) coordinates, from the mobile communication device to a computing device. The computing device verifies that the GPS coordinates are associated with the airport, or more particularly with the security zone or the boarding zone of the airport. The computing device then associates the mobile communication device with the identity from the copy of the mobile boarding pass. The computing device can be included in the identity inferring system. In further embodiments, the GPS coordinates can be sent from a first airport, a second airport, or a stopover airport, or can be stored for a retroactive validation. Additional confirmation of the association of the mobile communication device with the valid inferred real-world identity is available. Later, the mobile communication device, with associated valid inferred real-world identity, can be used for requests for access, requests for transactions, or as an ID. Authentication that the mobile communication device is associated with the valid inferred real-world identity can be provided by the computing device. The above activities are shown in FIGS. 1-3. A system is shown in FIG. 3, a method is shown in FIG. 4, and a suitable computing device is shown in FIG. 5.

FIG. 1 is an activity diagram showing a passenger checking in for an airline flight, and receiving a mobile boarding pass 106 onto a mobile communication device 104. A user 102, who is the passenger on the airline flight, has possession of the mobile communication device 104. In order for the mobile boarding pass 106 to be received by the mobile communication device 104, the mobile boarding pass 106 could be emailed to a user account, which is then accessed on the mobile communication device 104. Alternatively, the mobile boarding pass 106 could be downloaded into the mobile communication device 104 via a webpage which may or may not be accessed through social networks. Further mechanisms for placing the mobile boarding pass 106 into the mobile communication device 104 are readily devised.

FIG. 2 is an activity diagram showing the passenger of FIG. 1 undergoing a security check, in which the mobile boarding pass 106 and an identification 206 of the passenger are verified against the in-person appearance of the passenger, by security personnel. The user 102, as the passenger, displays the mobile boarding pass 106 on a display screen of the mobile communication device 104. Also, the user 102 produces and displays a security-acceptable ID 206, such as a driver's license, passport, etc. Security personnel 204 view the user 102, the mobile boarding pass 106 as displayed on the mobile communication device 104, and the security-acceptable ID 206. If the security personnel 204 concludes that the user 102, the mobile boarding pass 106 and the security-acceptable ID 206 are all consistent, i.e., the identity of the user 102 as represented in the mobile boarding pass 106 and the security-acceptable ID 206 is consistent with the appearance of the user 102, the user 102 is allowed to pass through security.

Upon receiving permission or direction from security personnel 204, the user 102 steps into and through the security portal 208, which may include a metal detector, imaging electronics and so on, and proceeds into the security zone 212. The user 102 then proceeds to the boarding zone 210 for the particular flight shown on the mobile boarding pass 106. It should be appreciated that the security zone 212 includes areas that are considered secure, as only people who have passed a security check or are otherwise authorized are allowed into the security zone 212. The security zone 212 includes boarding zones for various flights. The user 102 performs various actions as discussed with regard to FIG. 3.

FIG. 3 is a system diagram of an identity inferring system, which associates the mobile communication device 104 of the passenger with a valid inferred real-world identity, in accordance with an embodiment of the present disclosure. The identity inferring system includes a computing device 302, which has a processor 304, a memory 306, and a communication module 308. The mobile communication device 104, which is possessed by the user 102, has a display module 340, a communication module 342, a GPS module 344, memory 346, and applications 348. It should be appreciated that the mobile communication device includes a processor. Communication between the mobile communication device 104 and the computing device 302 is routed through a network. In the example shown, the network includes a cellular network and a global communication network 320, such as the Internet. Cellular network towers 314, 316, 318 couple to the global communication network 320, such as through cellular gateways. For example, the mobile communication device 104 could use the communication module 342 to communicate with the communication module 308 of the computing device 302 via a cellular tower 314 and the global communication network 320. Other mechanisms for communicating between the mobile communication device 104 and a computing device 302 are readily devised. The computing device 302 and the mobile communication device 104 could be proximate to each other, or physically remote from each other.

Referring to FIGS. 2 and 3, the user 102, as a passenger of an airline flight, is now in a security zone 212 or a boarding zone 210 of the airport. The mobile boarding pass 106 shows that the user 102 is a passenger scheduled for a flight, e.g., on an airplane 322, from a first airport 324 to a second airport 326, possibly with a stopover airport 328 en route. In order to infer a real-world identity, which will be associated with the mobile communication device 104, the computing device 302 acquires a copy 310 of the mobile boarding pass from the mobile communication device 104. This could happen in various ways, in various embodiments. For example, the user 102 could send an email from the mobile communication device 104 to the computing device 302, with a copy 310 of the mobile boarding pass attached to or otherwise included in the email. The computing device 302 could pull the copy 310 of the mobile boarding pass from the mobile communication device 104. An application 348 executing in the mobile communication device 104 could send the copy 310 of the mobile boarding pass from the mobile communication device 104 to the computing device 302.

In order to validate the inferred real-world identity, the computing device 302 acquires GPS coordinates 312 from the mobile communication device 104. This could happen in various ways, in various embodiments. For example, the GPS module 344, inside the mobile communication device 104, could calculate the GPS coordinates using data from GPS satellites. The user 102 could send an email from the mobile communication device 104 to the computing device 302, with a GPS coordinates 312 attached to or otherwise included in the email. The computing device 302 could pull the GPS coordinates 312 from the mobile communication device 104. An application 348 executing in the mobile communication device 104 could send the GPS coordinates 312 from the mobile communication device 104 to the computing device 302. In some embodiments, the copy 310 of the mobile boarding pass and the GPS coordinates 312 are sent separately, and in some embodiments these are sent together, i.e., contemporaneously. In some embodiments, one or both of these are retained in the memory 346 of the mobile communication device 104 for later, retroactive use. The copy 310 of the mobile boarding pass and the GPS coordinates 312 are accompanied by time and date stamps, for authentication purposes, in some embodiments.

The computing device 302 loads the electronic copy 310 of the mobile boarding pass from the mobile communication device 104 to the memory 306 of the computing device 302. The computing device 302 loads the GPS coordinates from the mobile communication device 104 to the memory 306 of the computing device 302. Then, the computing device 302 evaluates whether the GPS coordinates correspond to the airport 324. The computing device 302 could do so by using data from a lookup table, or a database, or by using an application present in the memory 306 of the computing device 302 or available in the global communication network 320. If the result of this evaluating is positive, i.e., the GPS coordinates do correspond to the airport 324, the computing device 302 associates the mobile communication device 104 with the identity as a valid inferred real-world identity. The identity corresponds to the identity indicated by the electronic copy 310 of the mobile boarding pass. For example, the full name of the user 102, who is in possession of the mobile communication device 104, is extracted from information on the copy 310 of the mobile boarding pass, and associated with the mobile communication device 104.

Having inferred a real-world identity from the copy 310 of the mobile boarding pass, and having validated the real-world identity by validating the GPS coordinates 312, the computing device 302 can then indicate that the mobile communication device is associated with a valid inferred real-world identity corresponding to the identity indicated by the electronic copy of the mobile boarding pass. In further embodiments, further types of verifications can occur. In some embodiments, there is a multi-tiered confidence level applied to the inferred real-world identity, which could be expressed using a scale.

For example, the GPS data could be sent from the mobile communication device 104 while the user 102 and the mobile communication device 104 are at the first airport 324, from which the flight originates. The GPS data could be sent from the mobile communication device 104 while the user 102 and the mobile communication device 104 are at the second airport 326, after the airplane 322 has landed at this destination. The GPS data could be sent from the mobile communication device 104 while the user 102 and the mobile communication device 104 are at a stopover airport 328, along the flight path between the originating airport 324 and the destination airport 326. Having and confirming GPS data from more than one of these airports 324, 326, 328 could boost the confidence level. GPS data could be sent from other locations, such as a hotel at which the user 102 is registered or has a reservation. GPS data could be sent from a conference at which the user 102 has a reservation and is attending. GPS data could be sent from further airports and further flights. Any of these could boost the confidence level. In a still further embodiment, verification of various biometrics such as a retina scan, 3-D facial biometrics (based on a scan of the face of the user 102), voiceprint biometrics and so on could be applied, to boost the confidence level. In variations, any of these could be used to establish the initial verification or determination, and further ones of these could be used to increase the confidence level.

In some embodiments, flight information is accessed by the computing device 302. The flight information is checked to see if the user 102 is listed as a passenger on the airline flight, i.e., the passenger list of the airline flight includes the identity shown by the electronic copy 310 of the mobile boarding pass. In some embodiments, the flight information is checked to see if the airline flight occurred. The flight information could be accessed in a database 330, via the global communication network 320. For example, the airlines could provide access to an airline database, the airport could provide access to an airport database, a user could provide access to a personal membership airline account or a personal membership travel account, e.g., by supplying a temporary password or a security agency could provide access to a security database. The association of the mobile communication device 104 with the valid inferred real-world identity can be confirmed by matching the electronic copy of the mobile boarding pass with the flight information, i.e., correlating the identity and the airline flight, as obtained from the electronic copy of the mobile boarding pass, with flight information obtained from a further source. This confirmation could also boost the confidence level previously discussed.

In some embodiments, the computing device 302 provides authentication, assertion or indication that the mobile communication device is associated with the valid inferred real-world identity, in response to requests. For example, a request could be sent from a requester 332 to the computing device 302 via the global communication network 320. The request could be a request to validate the in-person identity of a user 102 holding the mobile communication device 104. The request could be a request initiated from the mobile communication device 104, such as a request to join a membership organization or a request for information that is privileged to certain users, e.g., access to medical, financial, law enforcement or other records. The request could be for a transaction initiated by the user 102 holding the mobile communication device 104, such as a financial transaction involving banking or credit, e.g., a credit card transaction. The request could be for a transaction initiated from the mobile communication device 104, such as a purchase of a good or a service. The request could be to validate any of the above. The request could come from the user 102, or from a third party. Either the user 102 or the third party could request validation of information originating from the mobile communication device.

It should be appreciated that while the example of a boarding pass for a flight was used in this example, the embodiments may be extended to other security checks that may be leveraged for integration into the embodiments described herein. For example, any security check performed by the TSA or other organization may be leveraged for use with the embodiments described herein. In addition, depending on the level of confidence provided by the security check, the embodiments can provide different levels of confidence to infer that an online user's claimed online ID (identification) corresponds to the user's government-issued ID or other security-acceptable ID. Examples of other security checks include hotel reservations, conference reservations, credit card purchases, security checks associated with other modes of transportation checks related to bus, ship, or train transportation, and other forms of identity verification associated with "Big Data." The embodiments may be extended to any system where a person crosses through a security checkpoint where a form of identification was verified and the identification verification was required to obtain access to a secured area or cross the security check point. The person may then leverage this information to receive an assertion or verification that the real world identity corresponds to the identification information verified at the security checkpoint.

FIG. 4 is a flow diagram of a method for inferring real-world identities, which can be practiced using activities as shown in FIGS. 1, 2 and 3, and/or the identity inferring system of FIG. 3. The real-world identity is inferred from the copy of the mobile boarding pass, validated using the GPS data, and then associated with the mobile communication device. Further validation can be performed, i.e., the inferred real-world identity can be further confirmed, with application of additional information.

At check-in, in an action 402, the mobile boarding pass is placed into the mobile communication device. For example, the mobile boarding pass could be sent to the mobile communication device by the personnel at the check-in desk at the airport. In some embodiments the mobile boarding pass is digitally signed by the issuer. It should be appreciated that the digital signature is one manner to authenticate the copy of the mobile boarding pass, as other techniques may be readily devised. Action 402 may be referred to as receiving an authenticated copy of a document, the document having identification information and the document subject to a security check. At the security check, in an action 404, the passenger, the mobile boarding pass as displayed on the mobile communication device, and a security-acceptable identification are verified. For example, TSA personnel could perform this verification by viewing the mobile boarding pass as displayed on the mobile communication device, viewing the security-acceptable identification such as a driver's license or a passport, and viewing the passenger as presented in person. Upon verification of the identification, the owner of the authenticated document enters the secured area associated with the security check.

A copy of the mobile boarding pass is conveyed from the mobile communication device to the computing device, in an action 406. This could happen as a push, a pull, or other transfer, as the computing device receives the copy of the mobile boarding pass and loads the copy of the mobile boarding pass into a memory of the computing device. It should be appreciated that an electronic copy, or a physical copy, of a document verifying a security check other than a boarding pass may be utilized with the embodiments described herein, as a boarding pass is one example of such a document and this one example is not meant to be limiting. GPS coordinates are conveyed from the mobile communication device to the computing device, in an action 408. This could happen as a push, a pull, or other transfer, as the computing device receives the GPS coordinates and loads the GPS coordinates into the memory of the computing device.

The GPS coordinates are verified, in an action 410. For example, the computing device could verify that the GPS coordinates correspond to the first airport, the second airport or a stopover airport of the airline flight, in accordance with information on the copy of the mobile boarding pass. The computing device could further verify that the GPS coordinates correspond to an airline terminal, a security zone or a boarding zone of the airport. Thus, the GPS coordinates provide evidence that the owner of the authenticated document entered the secured area associated with the security check or passed the security check validating the identification information contained in the document. Action 410 may be referred to as providing evidence that an owner of the authenticated copy of the document passed the security check validating the identification information contained in the document. Timeliness of the GPS coordinates could be checked relative to the electronic copy of the mobile boarding pass in some embodiments. Timeliness could be expected in various ranges, for example within a specified time span of when the mobile boarding pass is received or sent, or within a specified time span preceding the departure of the flight. Timeliness could be expected in an extended range, for example when a retroactive verification of the inferred identity is being performed. It should be appreciated that the verification in action 410 may also be referred to as determination that the GPS coordinates correspond to a location accessible through the electronic copy. For example, with respect to a mobile boarding pass the GPS coordinates may relate to the area of the airport passed the secure checkpoints, the boarding area for a flight, etc. Examples other than airport/boarding passes may be utilized with the embodiments. For instance, the electronic copy of the document may enable access to a train, ship, conference room, hotel, etc. As discussed herein, the different types of checks for these alternative examples may provide differing degrees of confidence for identity management, authentication, and certification processes. In addition, the embodiments are not limited to the use of GPS data as providing evidence that an owner of the authenticated document entered a secured area associated with the security check or passed a security check validating the identification information contained in an authenticated copy of a document subject to a security check. For example, the owner of the authenticated document may make a purchase within the secured area or swipe the mobile computing device at a kiosk in the secured area, etc., and this data may be used to prove the owner entered the secured area. Thus, the embodiments are not limited to an electronic copy of a document, as any authenticated document having identification information subject to a security check my be integrated with the embodiments described herein. In some embodiments, a tamper-proof paper copy or physical copy of a boarding pass may be utilized and mailed into the entity providing the assertion that the real world identity corresponds to the identification information of the authenticated document.

The identity, from the copy of the mobile boarding pass, is associated with the mobile communication device, in an action 412. For example, the computing device could store the name of the user or passenger, as extracted from the copy of the mobile boarding pass. The computing device could store the phone number of the mobile communication device or other identifying information about the mobile communication device, in association with the name of the user or passenger. These two pieces of information, namely the identifying information about the mobile communication device and the name of the user, could be associated by a link, proximity or sequence in memory, or in a database, or through another mechanism as readily devised in accordance with the teachings herein. In the action 414, the identity is confirmed with flight information. For example, the identity and the flight as obtained from the electronic copy of the mobile boarding pass could be verified against flight information obtained from a database. In some embodiments, the action 414 could occur after the action 412, or before the action 412. In some embodiments, the action 414 is omitted as action 414 is optional.

In the action 416, the identity is confirmed with additional information. For example, the identity could be confirmed with reservations or registrations. The identity could be confirmed with additional flights and flight information. The identity could be confirmed with biometrics, personal information, or other information relating to the individual. In some embodiments, the action 416 could occur before or after the action 414, or before or after the action 412. In some embodiments, the action 416 is omitted as action 416 is optional. In an action 420, the association of the mobile communication device with the valid inferred real-world identity is asserted. This assertion could come in the form of responding to requests for verification of an in-person identity, requests for information, or requests for transactions, among other possibilities. In some embodiments the assertion may be in response to a determination that the owner of the authenticated document entered the secured area. Action 420 may be referred to as asserting that a device is associated with a real-world identity corresponding to the identification information listed in the authenticated copy of the document, in response to a determination that the owner of the authenticated document entered the secured area. As mentioned above, the use of a boarding pass/airport example is not meant to be limiting as the embodiments can be extended to any process where a security checkpoint was crossed through and some form of identification was verified or some personal information was validated in order to enter the secured area. In alternative embodiments, the techniques described herein may be extended to a person that works in an area requiring security clearance, such as a government office, defense contractor, etc. For example, the person can verify that his mobile device entered into the secured area and the person has identification.

It should be appreciated that the methods described herein may be performed with a digital processing system, such as a conventional, general-purpose computer system. Special purpose computers, which are designed or programmed to perform only one function may be used in the alternative. FIG. 5 is an illustration showing an exemplary computing device which may implement the embodiments described herein. The computing device of FIG. 5 may be used to perform embodiments of the functionality for inferring identity in accordance with some embodiments. The computing device includes a central processing unit (CPU) 501, which is coupled through a bus 505 to a memory 503, and mass storage device 507. Mass storage device 507 represents a persistent data storage device such as a floppy disc drive or a fixed disc drive, which may be local or remote in some embodiments. The mass storage device 507 could implement a backup storage, in some embodiments. Memory 503 may include read only memory, random access memory, etc. Applications resident on the computing device may be stored on or accessed via a computer readable medium such as memory 503 or mass storage device 507 in some embodiments. Applications may also be in the form of modulated electronic signals modulated accessed via a network modem or other network interface of the computing device. It should be appreciated that CPU 501 may be embodied in a general-purpose processor, a special purpose processor, or a specially programmed logic device in some embodiments.

Display 511 is in communication with CPU 501, memory 503, and mass storage device 507, through bus 505. Display 511 is configured to display any visualization tools or reports associated with the system described herein. Input/output device 509 is coupled to bus 505 in order to communicate information in command selections to CPU 501. It should be appreciated that data to and from external devices may be communicated through the input/output device 509. CPU 501 can be defined to execute the functionality described herein to enable the functionality described with reference to FIGS. 1-4. The code embodying this functionality may be stored within memory 503 or mass storage device 507 for execution by a processor such as CPU 501 in some embodiments. The operating system on the computing device may be MS DOS™, MS-WINDOWS™, OS/2™, UNIX™, LINUX™, or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments can also be embodied as computer readable code on a computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for inferring real-world identities in a computing environment, performed by a processor-based computerized system, comprising:
   receiving, from a mobile communication device, an electronic mobile boarding pass listing identification information of a passenger;
   receiving, from the mobile communication device, first global positioning system (GPS) coordinates of the mobile communication device captured at a first point in time; verifying that the first GPS coordinates correspond to a first security zone of a first facility that only allows entry of the passenger into the first security zone after a first security personnel verifies that the electronic mobile boarding pass, a government-issued ID, and a first in-person appearance of the passenger all match;
   in response to the verifying that the first GPS coordinates correspond to the first security zone, determining that the first security personnel verified that the electronic mobile boarding pass, the government-issued ID, and the first in-person appearance of the passenger all match;
   receiving, over a network, a first request to authenticate that the mobile communication device is associated with a real-world identity of the passenger corresponding to the identification information listed in the electronic mobile boarding pass in order to authorize a first transaction initiated on the mobile communication device, the first transaction unrelated to travel associated with the electronic mobile boarding pass;
   in response to the first request and to the determining that the first security personnel verified that the electronic mobile boarding pass, the government-issued ID, and the first in-person appearance of the passenger all match, responding to the first request with a first confidence level of authentication that the mobile communication device is associated with the real-world identity of the passenger;
   verifying that the first point in time of the first GPS coordinates are within a specified time span preceding a departure of a flight corresponding to the electronic mobile boarding pass; and
   receiving, over the network, a second request to authenticate that the mobile communication device is associated with the real-world identity of the passenger in order to authorize a second transaction initiated on the mobile communication device, the second transaction unrelated to travel associated with the electronic mobile boarding pass; and
   in response to the second request and to the verifying that the first point in time of the first GPS coordinates are within the specified time span preceding the departure of the flight corresponding to the electronic mobile boarding pass, responding to the second request with a second confidence level of authentication that the mobile communication device is associated with the real-world identity of the passenger, the second confidence level being higher than the first confidence level.

2. The method of claim 1, further comprising:
   accessing flight information;
   verifying that the flight information shows that the real-world identity is listed as a passenger on an airline flight that is consistent with the electronic mobile boarding pass; and
   receiving, over the network, a third request to authenticate that the mobile communication device is associated with the real-world identity of the passenger in order to authorize a third transaction initiated on the mobile communication device, the third transaction unrelated to travel associated with the electronic mobile boarding pass; and
   in response to the third request and to the verifying that the flight information shows that the real-world identity is listed as a passenger on the airline flight that is consistent with the electronic mobile boarding pass, responding to the third request with a third confidence level of authentication that the mobile communication device is associated with the real-world identity of the passenger, the third confidence level being higher than the second confidence level.

3. The method of claim 1, further comprising:
   receiving, from the mobile communication device, second GPS coordinates of the mobile communication device captured at a second point in time that is subsequent to the first point in time;
   verifying that the second GPS coordinates correspond to a second security zone of a second facility that only allows entry of the passenger into the second security zone after a second security personnel verifies that the electronic mobile boarding pass, the government-issued ID, and a second in-person appearance of the passenger all match;

in response to verifying that the second GPS coordinates correspond to the second security zone, determining that the second security personnel verified that the electronic mobile boarding pass, the government-issued ID, and the second in-person appearance of the passenger all match;

receiving, over the network, a third request to authenticate that the mobile communication device is associated with the real-world identity of the passenger in order to authorize a third transaction initiated on the mobile communication device, the third transaction unrelated to travel associated with the electronic mobile boarding pass; and in response to the third request and to determining that the second security personnel verified that the electronic mobile boarding pass, the government-issued ID, and the second in-person appearance of the passenger all match, responding to the third request with a third confidence level of authentication that the mobile communication device is associated with the real-world identity of the passenger, the third confidence level being higher than the first second confidence level.

4. The method of claim 3, wherein each of the first facility and the second facility is one or more of an airport, a bus station, a ship port, and a train station.

5. The method of claim 4, further comprising:
in response to the response with the third confidence level of authentication, performing the third transaction.

6. One or more tangible, non-transient, computer-readable media having instructions thereupon which, when executed by one or more processors, cause the one or more processors to perform a method for inferring real-world identities in a computing environment, the method comprising:

acquiring, from a mobile communication device, an electronic mobile boarding pass for a passenger on an airline flight from a first airport to a second airport, the electronic mobile boarding pass listing identification information of the passenger;

acquiring, from the mobile communication device, first global positioning system (GPS) coordinates of the mobile communication device captured at a first point in time;

verifying that the first GPS coordinates correspond to a first security zone of the first airport, the second airport, or a stopover airport of the airline flight, the first security zone only allowing entry of the passenger into the first security zone after a first security personnel verifies that the electronic mobile boarding pass, a government-issued ID, and a first in-person appearance of the passenger all match;

in response to the verifying that the first GPS coordinates correspond to the first security zone, determining that the first security personnel verified that the electronic mobile boarding pass, the government-issued ID, and the first in-person appearance of the passenger all match;

receiving, over a network, a first request to authenticate that the mobile communication device is associated with a real-world identity of the passenger corresponding to the identification information listed in the electronic mobile boarding pass in order to authorize a first transaction initiated on the mobile communication device, the first transaction unrelated to travel associated with the electronic mobile boarding pass;

in response to the first request and to the determining that the first security personnel verified that the electronic mobile boarding pass, the government-issued ID, and the first in-person appearance of the passenger all match, responding to the first request with a first confidence level of authentication that the mobile communication device is associated with the real-world identity of the passenger;

acquiring, from the mobile communication device, second GPS coordinates of the mobile communication device captured at a second point in time that is subsequent to the first point in time;

verifying that the second GPS coordinates correspond to a second security zone of the first airport, the second airport, or the stopover airport of the airline flight, the second security zone only allowing entry of the passenger into the second security zone after a second security personnel verifies that the electronic mobile boarding pass, the government-issued ID, and a second in-person appearance of the passenger all match;

in response to verifying that the second GPS coordinates correspond to the second security zone, determining that the second security personnel verified that the electronic mobile boarding pass, the government-issued ID, and the second in-person appearance of the passenger all match;

receiving, over the network, a second request to authenticate that the mobile communication device is associated with the real-world identity of the passenger in order to authorize a second transaction initiated on the mobile communication device, the second transaction unrelated to travel associated with the electronic mobile boarding pass; and in response to the second request and to the determining that the second security personnel verified that the electronic mobile boarding pass, the government-issued ID, and the second in-person appearance of the passenger all match, responding to the second request with a second confidence level of authentication that the mobile communication device is associated with the real-world identity of the passenger, the second confidence level being higher than the first confidence level.

7. The one or more computer-readable media of claim 6, wherein the first security zone is a boarding zone of the first airport, the second airport, or the stopover airport of the airline flight.

8. The one or more computer-readable media of claim 6, wherein the processor is physically remote from the mobile communication device and communicates with the mobile communication device via the network.

9. The one or more computer-readable media of claim 6, wherein the first GPS coordinates are acquired by the processor pulling the first GPS coordinates from the mobile communication device.

10. The one or more computer-readable media of claim 6, wherein the first GPS coordinates are acquired via an application pushing the first GPS coordinates from the mobile communication device.

11. The one or more computer-readable media of claim 6, wherein the first GPS coordinates are stored in the mobile communication device for retroactive validation.

12. The one or more computer-readable media of claim 6, wherein the method further comprises:

correlating the real-world identity of the passenger and the airline flight, as obtained from the electronic mobile boarding pass, with flight information obtained from a further source;

receiving, over the network, a second request to authenticate that the mobile communication device is associated with the real-world identity of the passenger in order to authorize a second transaction initiated on the mobile communication device, the second transaction unrelated to travel associated with the electronic mobile boarding pass; and in response to the second request and to the correlating, authenticating with a second confidence level that the mobile communication device is associated with the real-world identity of the passenger, the second confidence level being higher than the first confidence level.

13. The one or more computer-readable media of claim 6, further comprising:

in response to the response with the first confidence level of authentication, delaying performance of the first transaction due to the first confidence level being below a threshold; and in response to the response with the second confidence level of authentication, performing the second transaction due to the second confidence level being above the threshold.

14. An identity inferring system for inferring real-world identities in a computing environment, comprising:

a memory;

a processor, coupled to the memory, the processor and the memory operable to:

communicate with a mobile communication device;

load an electronic mobile boarding pass from the mobile communication device to the memory, wherein information obtainable from the electronic mobile boarding pass includes identification information of a passenger and flight information having an originating airport, a destination airport, and a stopover airport;

load first global positioning system (GPS) coordinates captured at a first point in time from the mobile communication device to the memory;

verify that the first GPS coordinates correspond to a first security zone of the originating airport, the destination airport, or the stopover airport, the first security zone only allowing entry of the passenger into the first security zone after a first security personnel verifies that the electronic mobile boarding pass, a government-issued ID, and a first in-person appearance of the passenger all match;

in response to the verifying that the first GPS coordinates correspond to the first security zone, determine that the first security personnel verified the electronic mobile boarding pass and the government-issued ID with the first in-person appearance of the passenger;

receive, over a network, a first request to authenticate that the mobile communication device is associated with a real-world identity of the passenger corresponding to the identification information listed in the electronic mobile boarding pass in order to authorize a first transaction initiated on the mobile communication device, the first transaction unrelated to travel associated with the electronic mobile boarding pass;

in response to the first request and to the determining that the first security personnel verified the electronic mobile boarding pass and the government-issued ID with the first in-person appearance of the passenger, responding to the first request with a first confidence level of authentication that the mobile communication device is associated with the real-world identity of the passenger;

access flight information from one from a group consisting of: an airline database, a personal membership airline account, a personal membership travel account, an airport database, and a security database;

verify that the electronic mobile boarding pass matches the flight information; and receive, over the network, a second request to authenticate that the mobile communication device is associated with the real-world identity of the passenger in order to authorize a second transaction initiated on the mobile communication device, the second transaction unrelated to travel associated with the electronic mobile boarding pass; and in response to the second request and to the verifying that the electronic mobile boarding pass matches the flight information, respond to the second request with a second confidence level of authentication that the mobile communication device is associated with the real-world identity of the passenger.

15. The identity inferring system of claim 14, wherein the first transaction includes a credit card transaction that is unrelated to the travel associated with the electronic mobile boarding pass.

16. The identity inferring system of claim 14, wherein the first transaction includes a transaction to gain access to records that are privileged to the passenger and that are unrelated to the travel associated with the electronic mobile boarding pass.

17. The identity inferring system of claim 14, wherein the first transaction requires confirmation of an in-person identity of a holder of the mobile communication device and is unrelated to the travel associated with the electronic mobile boarding pass.

18. The identity inferring system of claim 14, wherein the processor and the memory are further operable to:

load second GPS coordinates captured at a second point in time from the mobile communication device to the memory;

verify that the second GPS coordinates correspond to a second security zone of the originating airport, the destination airport, or the stopover airport, the second security zone only allowing entry of the passenger into the second security zone after a second security personnel verifies that the electronic mobile boarding pass, the government-issued ID, and a second in-person appearance of the passenger all match;

in response to verifying that the second GPS coordinates correspond to the second security zone, determine that the second security personnel verified that the electronic mobile boarding pass, the government-issued ID, and the second in-person appearance of the passenger all match;

receive, over the network, a third request to authenticate that the mobile communication device is associated with the real-world identity of the passenger in order to authorize a third transaction initiated on the mobile communication device, the third transaction unrelated to travel associated with the electronic mobile boarding pass; and in response to the third request and to the determining that the second security personnel verified that the electronic mobile boarding pass, the government-issued ID, and the second in-person appearance of the passenger all match, respond to the third request with a third confidence level of authentication that the mobile communication device is associated with the real-world identity of the passenger, the third confidence level being higher than the second confidence level.

* * * * *